United States Patent [19]
Vokhmin

[11] Patent Number: 5,627,638
[45] Date of Patent: May 6, 1997

[54] METHOD AND APPARATUS FOR DETECTING DEFECTS IN LENSES

[75] Inventor: Peter A. Vokhmin, Dimona, Israel

[73] Assignee: Prolaser Ltd., Rosh Ha'ayin, Israel

[21] Appl. No.: 569,115

[22] PCT Filed: Jul. 1, 1994

[86] PCT No.: PCT/US94/07483

§ 371 Date: Dec. 18, 1995

§ 102(e) Date: Dec. 18, 1995

[87] PCT Pub. No.: WO95/01558

PCT Pub. Date: Jan. 12, 1995

[30] Foreign Application Priority Data

Jul. 1, 1993 [IL] Israel ............................ 106207

[51] Int. Cl.⁶ .................................... G01N 21/88
[52] U.S. Cl. .......................... 356/124; 356/239; 356/240; 356/237; 250/223 B; 250/559.01
[58] Field of Search ..................... 356/124, 203, 356/239, 240, 103, 120, 237; 250/223 B, 563, 572

[56] References Cited

U.S. PATENT DOCUMENTS 3,892,494 7/1975 Baker et al. ............................. 356/239
3,988,068 10/1976 Sprague ................................. 356/124
5,355,213 10/1994 Dotan ..................................... 356/239

Primary Examiner—Frank Gonzalez
Assistant Examiner—Michael P. Stafira
Attorney, Agent, or Firm—Helfgott & Karas, P.C.

[57] ABSTRACT

There is provided a method and an apparatus for testing an optical component for cosmetic defects, the component having optical surfaces, a peripheral surface and a bulk defined by the optical and peripheral surfaces, a range of inspection of the component including at least one optical surface and the bulk of the component at least in the vicinity of the one optical surface. The method includes producing at least one beam of inspection radiation and directing rays of the at least one beam onto the peripheral surface at such angles as to enable the rays to travel in the bulk of the component by multiple total internal reflections from the at least one optical surface, providing illumination of each point in the inspection range by set of rays at different angles, and to emerge from the component through the peripheral surface, and monitoring a radiation scattered by the defects and emerging from the component through the at least one optical surface, thereby identifying the defects.

26 Claims, 7 Drawing Sheets

METHOD AND APPARATUS FOR DETECTING DEFECTS IN LENSES

FIELD OF THE INVENTION

This invention relates to a method and apparatus for detecting defects in optical components such as lenses, particularly cosmetic defects consisting of surface flaws and occlusions.

BACKGROUND OF THE INVENTION

Optical components of transparent material, for example, optical ophthalmic lenses, must be tested for defects prior to their utilization, particularly for surfaces flaws such as scratches, smears, cracks, chips, stains, and for occlusions such as bubbles or streaks. Limit values of tolerable flaws are established in internationally recognized standards for precision optics, specifically DIN 3140 or MIL-0-13830 or less stringent standards used by the ophthalmic industry, such as DIN 58203.

Conventionally, the testing is carried out by visual inspection by trained personnel, mostly in a darkened room. Such a procedure is expensive, not sufficiently objective and not sufficiently reliable. Therefore, efforts are being made to develop methods and devices for the automatic and objective testing of optical components.

DE-OS 2337597 discloses a test method according to which a light ray is focused on the surface of the optical component to be tested and is sequentially moved over said surface, while being kept in focus. Illumination of the object to be tested is, in this case, achieved in that the test piece rotates on its axis and the impinging light ray is slowly radially deflected in such a way that it describes a spiral-shaped pattern on the test piece, whereby its state of focus must be continuously readjusted according to the curvature of the surface to be scanned. The light which penetrates the component is reflected backwards, passes once again through the component, and then impinges on a detector. The deviations in the intensity of the signal received make it possible to deduce a flaw and to localize it. Such a method, however, requires very expensive devices for carrying it out. Furthermore, said method does not allow to differentiate between surface flaws and dust or water marks on the surface of the component.

German Patent Application No. 3620108 describes a method according to which the optical component to be tested is rotated on its axis and is illuminated by a light beam which is displaced along the diameter of the component at a frequency greater than the angular rotation speed of the component, whereby a spoke-shaped pattern is generated. This pattern moves once through the component when the same is turned by 360%, and in this way uniformly illuminates each point of its volume with light in approximately the same state of focus. The radiation, the normal diffusion of which is disturbed by any possible flaws in the surfaces of or inside the component, is detected in the post-installed testing system and only the light diffracted by flaws in the component Is used to produce the image. A device operating in this way is expensive and this method does not differentiate between dust or water marks and flaws of a component.

DE-OS 3237511 discloses placing the optical components to be tested in the optical path of a television camera and displaying through the component a test pattern on the camera. The disturbances caused by flaws in the component produce a video signal which deviates from a control signal that is not influenced by the component. The deviations between the control signal and the actual signal received permit to identify the flaws. By this method, however, smaller flaws, such as those resulting from scratching, smears or hairline cracks, cannot be detected, and it is impossible to differentiate dust or water marks from surface flaws.

DE-OS 3011014 attempts to increase the sensitivity of the aforesaid testing procedure by suggesting that the component to be tested be illuminated completely, a television image be produced, and flaws be deduced by line-for-line analysis of the video signal. Such a procedure is complicated, expensive, not sufficiently accurate, and does not allow to differentiate dust and water marks from flaws or occlusions.

U.S. Pat. No. 3,988,068 discloses a method for detecting cosmetic defects in lenses, where in order to distinguish between actual defects and surface dust, it is suggested to direct a light into the lens through its peripheral edges so that the light will impinge upon the front surface at angles more than critical angle to undergo one total internal reflection within the lens and leave the lens though its edge, and to detect a light scattered by any of the defects. It is mentioned in the patent that for this purpose the light sources should be aligned relative to a front surface of the lens, which alignment may be "easily . . . accomplished with slight amount of experimentation". However, there is not a single hint in the patent how to provide such alignment or according to which requirements it should be accomplished. Neither it is mentioned how to avoid emerging of light, which travels within the lens in a non-controllable way, through inspected surface and how to avoid the illumination of the non-finished surface by the non-controlled illumination light. Moreover, the disclosed method is not effective as it clearly cannot provide for sufficient detection capability seeing that the light from each illumination source illuminates each defect under an extremely narrow range of angles thus decreasing a possibility of the scattered light to reach the detection means and consequently its detectability. Furthermore, the illumination of the inspected surface and bulk of the lens is not homogeneous influencing the sensitivity of the method. In addition, it is very important in this method for the edge of the lens to be of good quality and this requirement also restricts applicability of the method.

SUMMARY OF THE INVENTION

It is the purpose of the present invention to provide improved, more reliable and less complicated and expensive method and apparatus for testing optical components for cosmetic defects.

Other purposes and advantages of the invention will become apparent as the description proceeds.

In the further description and claims the term "sagittal plane of the optical component" means a plane in which the central line of the optical edge lies; generally, when the component is laid on a flat surface, the sagittal plane is parallel to the surface. The term "meridional plane" means a plane containing the optical axis of the component and chief rays of illumination radiation; generally said plane is perpendicular to the plane of the edge (sagittal plane). The term "optical surfaces" refers to those optical surfaces of the inspected component which may be crossed by a directed light when the component is in its normal use. By the "range of inspection" is meant herein a portion of the optical component in which the cosmetic defects will be identified in each application of the present invention.

In accordance with the present invention, there is provided a method for testing an optical component having optical surfaces, a peripheral surface and a bulk defined by said optical and peripheral surfaces, for cosmetic defects in a range of inspection including at least one said optical surface and said bulk of the component at least in the vicinity of said one optical surface, said method consists of producing at least one beam of inspection radiation and directing rays of said at least one beam onto said peripheral surface at such angles as to enable the rays to travel in said bulk of the component by multiple total internal reflections from said at least one optical surface, providing each point in said inspection range to be illuminated by set of rays at different angles, and to emerge from said component through said peripheral surface, and monitoring a radiation scattered by said defects and emerging from the component through said at least one optical surface, thereby identifying said defects.

It is known that a light beam propagating in a medium with a refractive index n (n>1) will be totally internally reflected from an interface between the medium and the air (n=1) if an angle of incidence of the light beam on the interface is larger than the critical angle "$\gamma$":

$$\gamma = \text{arc sin}(1/n),$$

Therefore, in order to provide radiation propagation within a transparent optical component by multiple total internal reflections, it is necessary to keep the angles of incidence of its beams on optical surfaces of the component larger than the above critical angle. However, with a variety of shapes of optical and peripheral surfaces of the optical components such as lenses, the above requirement may be fulfilled only by means of a specific way of introducing the inspection radiation into the component which is defined by the set of angles at which the radiation beams should be introduced into the component and a position at the peripheral surface of the component where each radiation beam enters the component. Thus, in the preferred embodiment of the present invention directing of the at least one beam of said inspection radiation includes forming and orienting said beam substantially in the meridional plane of said component, and scattering said beam substantially in the sagittal plane of said component.

Thus, method, in accordance with the present invention, allows to controllably illuminate different kinds of optical components and provides an effective inspection of finished lenses, in which case the range of inspection includes both optical surfaces and said bulk of the component, as well as of semi-finished lenses, where the range of inspection includes a finished surface of the component and the portion of its bulk adjacent to the finished surface, the size of this portion depending upon the thickness of the semi-finished lens.

For a finished optical component with mutually parallel surfaces, such as optical plates and/or "plano" lenses, the inspection radiation may be inserted via all points of the the edges of the component at all possible angles $\alpha$, when the edge of the optical component constitutes with its optical surfaces an angle $\delta$ (in degrees) which is more than $2\gamma$.

However, if the optical surfaces of the component are inclined with respect to its edge at the angle $\delta$ which does not comply with the above condition, the illumination radiation may be inserted into the component via its edge at any angle $\alpha$ which satisfies the following condition in the meridional plane of the optical component (see FIG. 1$a$):

$$-90 < \alpha < \text{arc sin cos}(\delta + \epsilon) \quad (1)$$

here $\epsilon = 90 - \gamma$.

For different negative finished lenses precise values of insertion angles may be obtained by regular ray tracing calculations. However, these values may be approximately estimated by means of relation (2) given below for negative lenses with their diameter 2r, central thickness $t_o$, peripheral thickness $t_r$ and with curvature radii $R_1$ and $R_2$ and $\beta_{1,2}$=arc sin (r/$R_{1,2}$) (FIG. 1$b$). Relation (2) provides precise values for insertion angles for lenses with $t_r/r \ll 1$. In this case the inspection radiation will not leave the $$n \sin\{[\beta_1 + [x(\beta_2 - \beta_1) - \epsilon t_o]/t_r]\} < \sin\alpha < n \sin\{\beta_1 + [x(\beta_2 - \beta_1) + \epsilon t_o]/t_r\} \quad (2)$$

The relation (2) provides precise values for insertion angles for lenses with $t_r/r \ll 1$. In this case the inspection radiation will not leave the component through its optical surfaces, if the insertion angle $\gamma$ satisfies the condition (1) and the requirement (2).

For biconcave lens $R_1$ and, consequently, $\beta 1$ are negative values.

For all types of positive lenses with diameter of zone to be inspected 2p, the inspection radiation may be inserted via the edges of the lens, subject to condition (1), and through portions of their optical surfaces out of zones to be inspected at any angle $\theta$ which satisfies the next condition (3) in the meridional plane (see FIG. 1$c$):

$$\theta_{1,2} < \text{arc cos}(n \sin[\text{arc sin}(R_{1,2}/an) - \text{arc sin}(Lp/aR_{1,2})]) \quad (3)$$

where $L = R_2 + t_0 - R_1$, $$a = \sqrt{[L^2 + R_{12} \pm 2LR_{12} \cos \text{arcsin}(p/R_{12})]} \quad ,$$

the sign "+" and index "1" are to be used for determination of insertion angle through a convex surface of the lens, the sign "−" and index "2" are to be used respectively for its concave surface.

In case when a semi-finished lens is to be inspected, conditions should be provided for the illumination radiation to travel by multiple total internal reflections through a part of a bulk of the semi-finished lens adjacent to the finished surface without reaching the non-finished surface and a suitable range of insertion angles $\alpha$ should be calculated. For a semi-finished lens with diameter 2r, radius of the finished surface curvature R and minimal thickness t, the illuminating radiation may be inserted in an arbitrary point of its edge at a distance x from the finished surface (see FIG. 1$d$) at any angle in the following range:

$$\text{arc sin}(n \sin(\beta - \Delta\phi)) < \alpha < \text{arc sin}(n \sin(\beta + \Delta\phi)) \quad (4)$$

here $\beta = \text{arc sin}(r/R)$, $\Delta\phi$ is determined in implicit form by the next expression:

$$\Delta\phi = \text{arc cos}\{(R-t)/[R-x \cos(\beta - \Delta\phi)]\} \quad (5)$$

The range of insertion angles a should be reduced by up to 4 degrees to provide compensation for scattering by the edges, if any.

In accordance with the present invention there is also provided an apparatus for performing the above method consisting of means for supporting the component to be tested;
illumination means for producing at least one inspection radiation beam;

means for conveying said at least one beam to a peripheral surface of the component including optical means for forming said at least one beam in a meridional plane of the component and for orienting said at least one beam in said meridional plane of the component so as to enable rays of said at least one beam to travel in a bulk of the component by multiple total internal reflections from at least one optical surface and to emerge from said component through its peripheral surface, and means for scattering said at least one beam in a sagittal plane of the component about its peripheral surface so as to provide said radiation with a substantial divergence in said sagittal plane;

means for receiving radiation, If any, emerging from the optical surface;

means for analyzing said radiation, thereby identifying said defects;

light protection means to avoid a non-controlled illuminating of the component.

In one preferred embodiment the inspection radiation consists of one beam, e.g. a laser beam, with a ring-shaped cross-section in a plane substantially parallel to said sagittal plane. In this case the apparatus further includes reflecting means for forming and orienting said beam and directing the beam through said scattering means to the peripheral surface of the component.

In another perfected embodiment, the inspection radiation consists of a number of beams which are introduced into the component at a number of zones along the peripheral surface of the component. In this case the beams may be provided either by dividing one beam from one radiation source, e.g. by means of optical fiber bundles, or by a plurality of independent radiation sources each of which produces one or more beams. Preferably, the radiation sources are arranged in a number of rings substantially parallel to said sagittal plane of the component and are adapted to controllably produce said radiation beams.

Preferably, the conveying means may include a combination of either reflecting and screening means or at least one lens and refraction optics, however other different suitable combinations may be employed.

In the preferred embodiment of the present invention, the radiation scattered by the defects and emerging from said component through said at least one optical surface is monitored by producing therefrom an image of complete lens or part of the lens, e.g. by means of a high-resolution TV camera with a lens having large depth of focus can be used for examination of both optical surfaces and bulk of the lenses. The image is transferred to a computer via a frame grabber to identify the defects of the component and to classify it by means of dedicated software. The image processing system analyzes the said image to detect the presence of a defect, its location, dimensions and type (dig, scratch, etc.). However, different monitoring and analyzing systems may be used.

Proper means are to be used to avoid non-controlled illumination of the inspected optical surfaces.

BRIEF DESCRIPTION OF THE DRAWINGS

For a better understanding, the invention and its further preferred features will now be described, by way of example only, with reference to the following drawings in which.

DESCRIPTION OF THE PREFERRED EMBODIMENTS

Figure 1A:
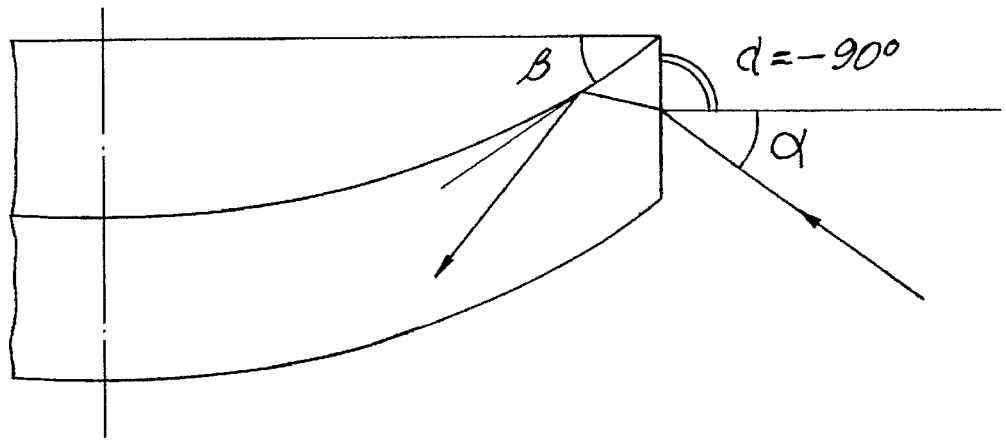
FIGS. 1a, 1b, 1c and 1d are sketches schematically illustrating conditions at which inspection illumination is introduced into different kinds of inspected components, according to the present invention.
Figure 1B:
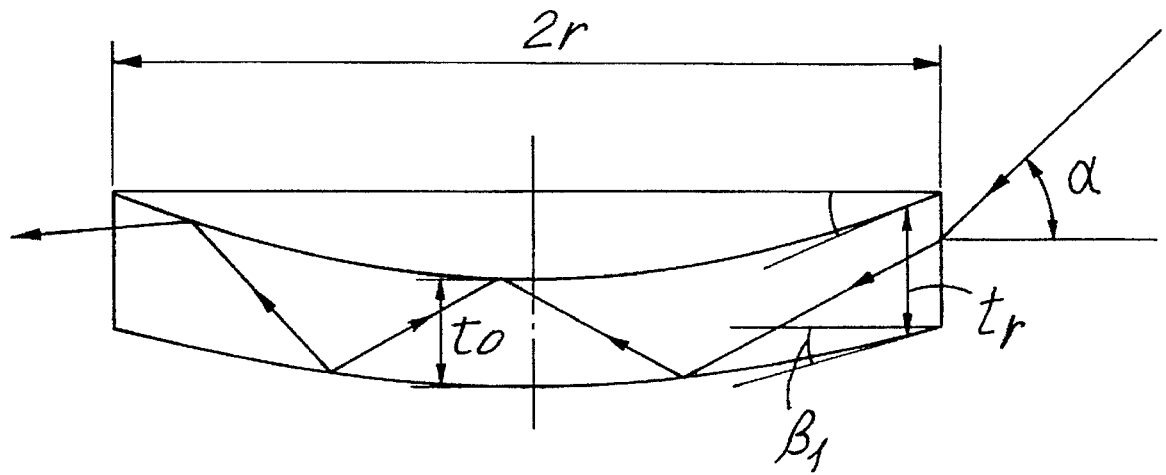
Figure 1C:
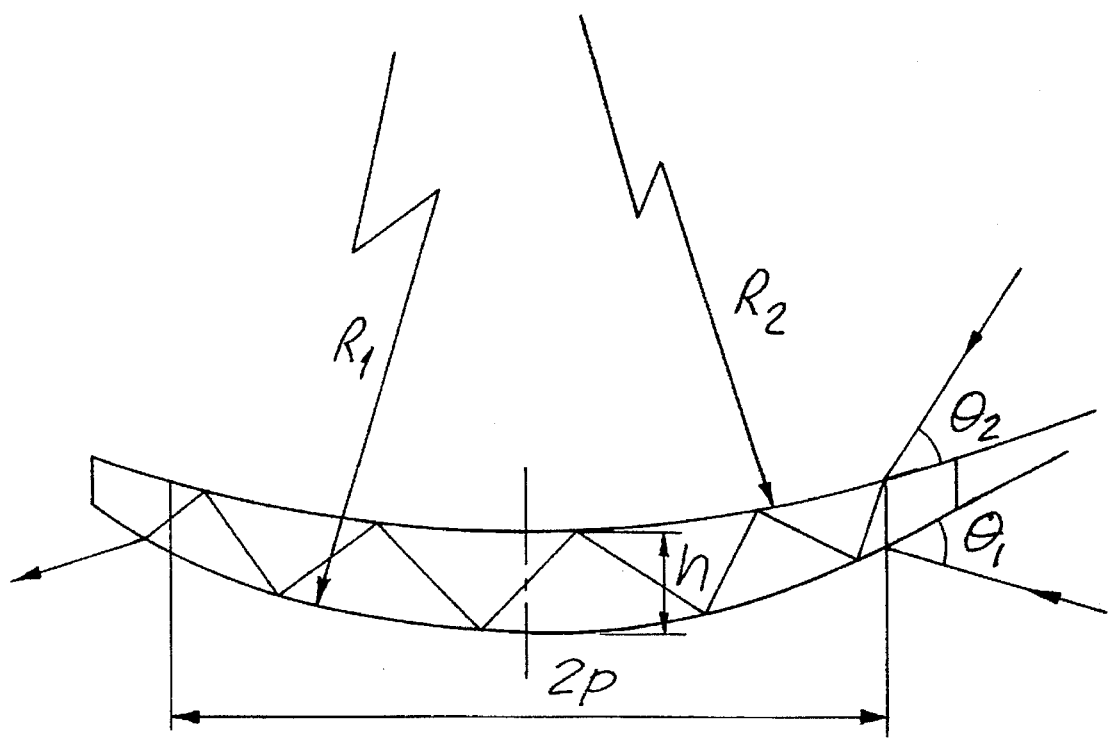
Figure 1D:
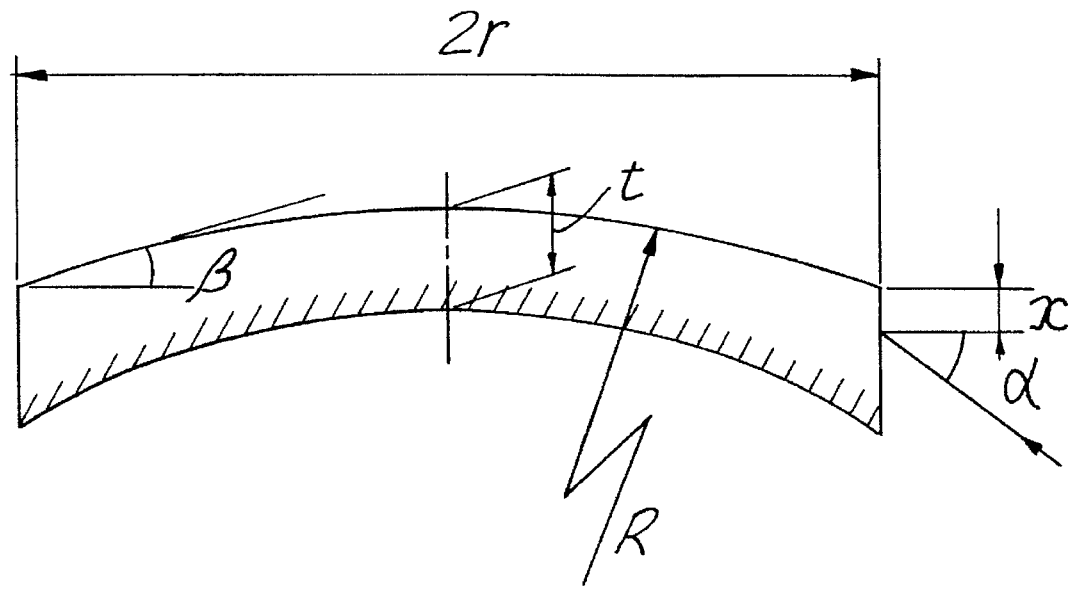
Figure 2:
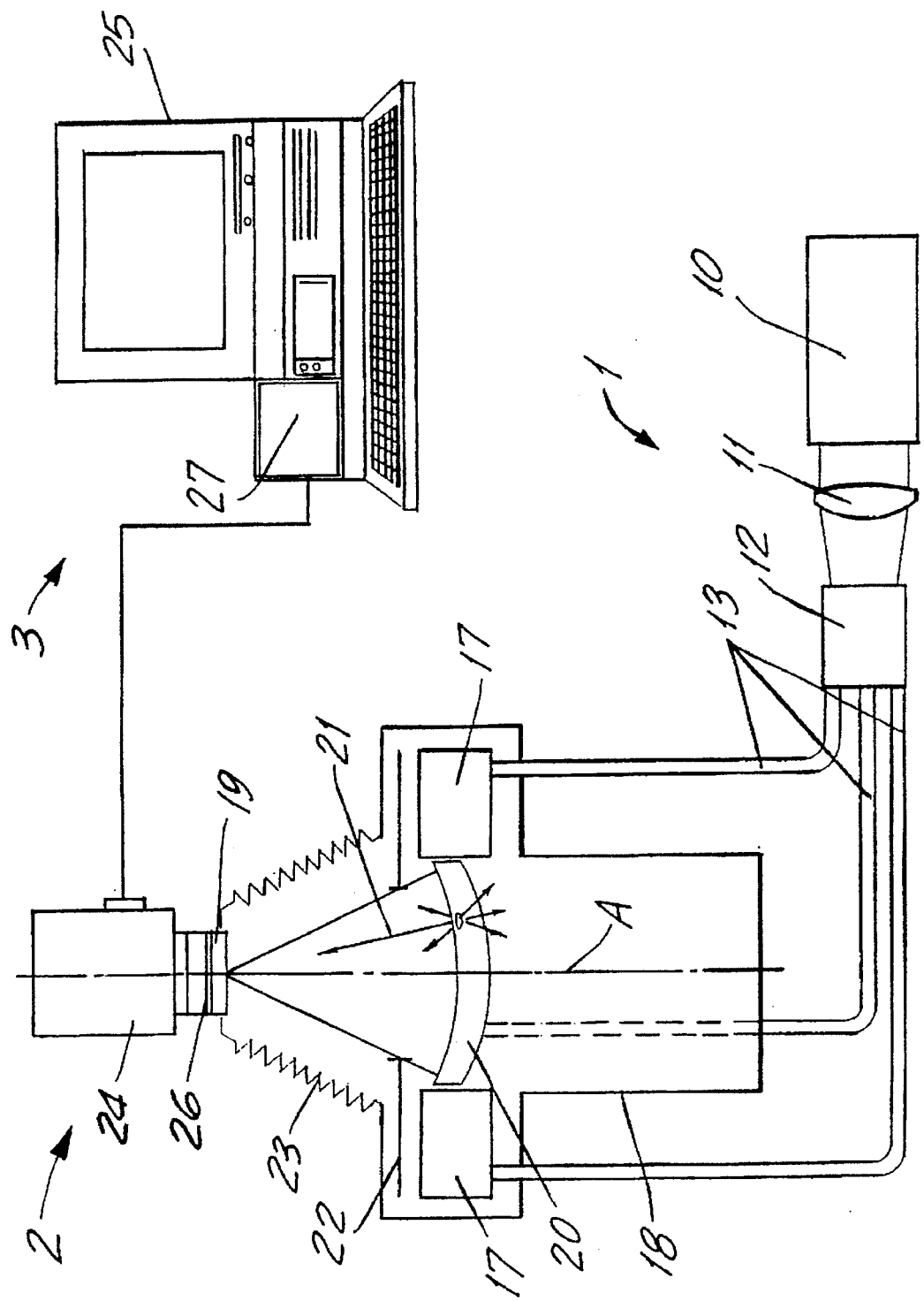
FIG. 2 is a schematic representation of an apparatus according to the embodiment of the invention.

FIG. 2 illustrates one embodiment of an apparatus for inspection of an optical component 20 in accordance with the present invention. The apparatus consists of an illuminating means, generally designated as 1, image acquisition means, generally designated as 2 and image processing means, generally designated as 3.

Figure 3:
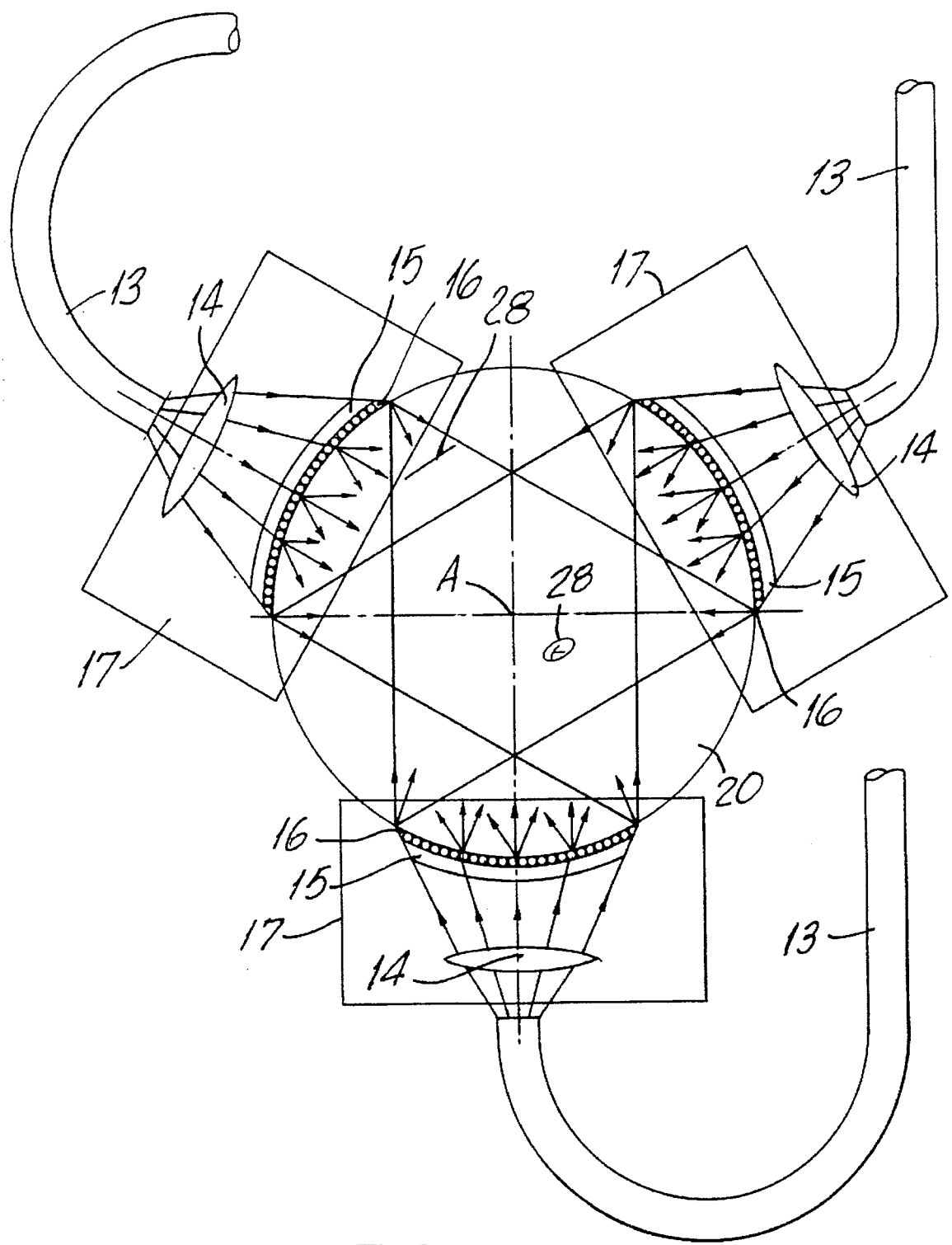
FIG. 3 is a schematic view of a component being inspected and parts of the apparatus holding and illuminating it, according to the embodiment of the invention, seen in a plane parallel to the sagittal plane of the component.

The illuminating means 1 includes a radiation source 10 and conveying means including a forming and orienting component 17. Generally, the radiation source may be of any desirable kind. In the preferred embodiment it is designed using an injection laser diode functioning at an operational wavelength of 790–870 nm and followed by a concentrating lens 11 and a trifurcated optical fiber bundle, generally designated as 12. Alternatively, the radiation source may be represented by a number of independent radiation sources, it being only necessary that a number of radiation beams be generated and be available for testing the component. As shown in FIG. 3, the fiber bundle is divided into three branches 13 providing three radiation beams, but they may be in a different number, e.g. less or more than 3. The outputs of the fiber bundle may be preferably adjusted by displacing them parallel to the component radius (radial displacement) and/or parallel to the component axis "A" (axial displacement).

In the described preferred embodiment the forming and orienting component 17 provided for each beam comprises a beam forming lens 14, an orientating element 15 and a scatterer 16. The lens 14 is preferably a positive lens adapted to determine an initial angular distribution of the inspection radiation beam in the meridional plane of the optical component. The lens 14 may be designed as a spherical lens, or as a cylindrical lens with its axis parallel to the edge of the inspected component. The lens 14 may be preferably adjusted by its radial displacement.

The orienting element 15 is in the form of a deflecting Fresnel prism, preferably designed as a section of a Fresnel prism with a variably deflecting angle (Fresnel cylindrical lens) and is adapted to impart to the illumination beam a desired orientation in a meridional plane of the component. The Fresnel prism 15 is placed between the forming lens 14 and the component 20 for deflecting the inspection radiation beam to the component through its edge. The Fresnel prism may be preferably adjusted by its axial displacement.

The scatterer 16 is placed between the Fresnel prism 15 and the component 20 and preferably designed as a lenticular, that is an array of optical surfaces consisting of many parallel cylinders with their axes parallel to the optical axis of the component 20. The scatterer is designed to form an extremely wide angle of divergence of radiation beam in a sagittal plane of the component 20, without affecting the beam angle distribution in its meridional plane. In the particular embodiment illustrated, each beam is scattered so as to cover 60° of the periphery of the component.

In order to avoid a non-controlled illumination of the component 20 it is screened by a light protective enclosure 18.

In operation, each inspection radiation beam produced, formed, oriented and scattered, in accordance with the present invention, by the respective elements of the illumination means enters the component to be inspected and travels through it, by multiple total internal reflections. Whenever it meets any single irregularity and/or occlusion in the component 20, it will be scattered by it to form beams, which emerge from the component through its optical surfaces, such as the one schematically indicated as 21 in FIG. 2.

The image acquisition means 2 includes a high resolution TV camera 24 having a lens 26 and a frame grabber 27. The beam passes to the lens 26 within a light protecting connector 23, and through an optical filter 19. The image produced by the camera 26 is transferred via the frame grabber 27 to the image processing means including computer 25, where It is processed by means of a dedicated software.

An iris diaphragm 22, interposed in the path of the beam, defines an area of interest and prevents the light, emerging from the edge of the component, from reaching the lens 26 of TV camera 24.

Figure 4:
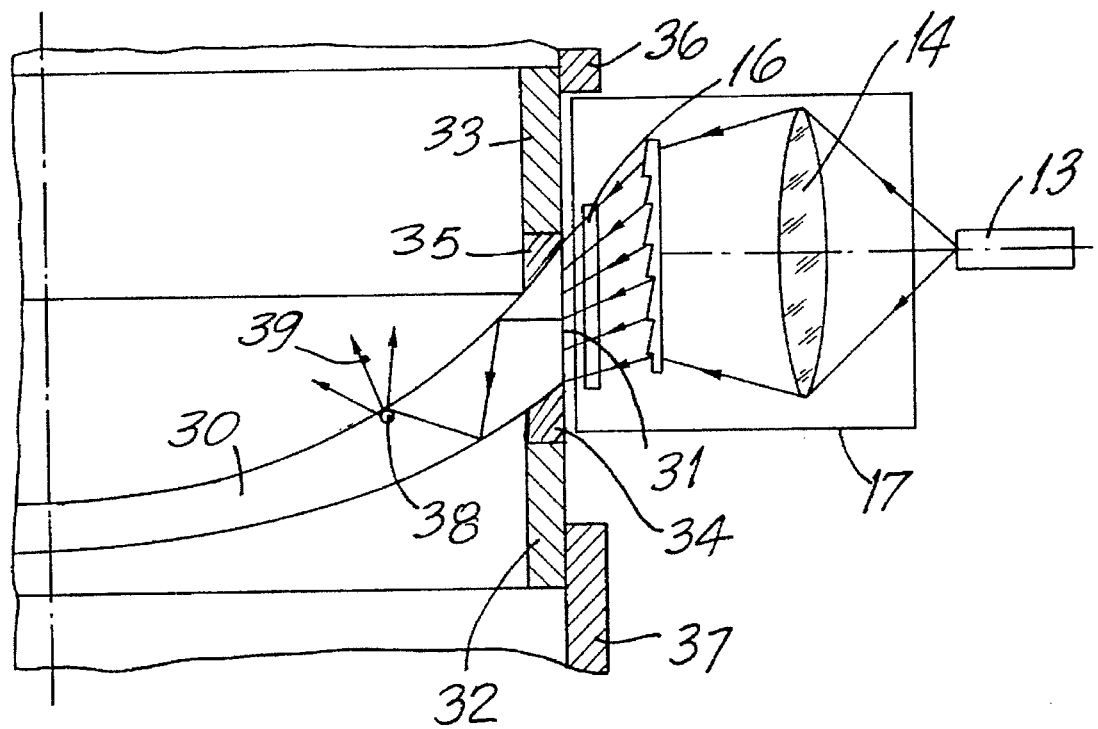
FIGS. 4 and 5 are schematic illustrations of the mounting of a component to be inspected, of the means for introducing inspection radiation into it, of a paths of radiation rays within the component and of its scattering by the component imperfections.
Figure 5:
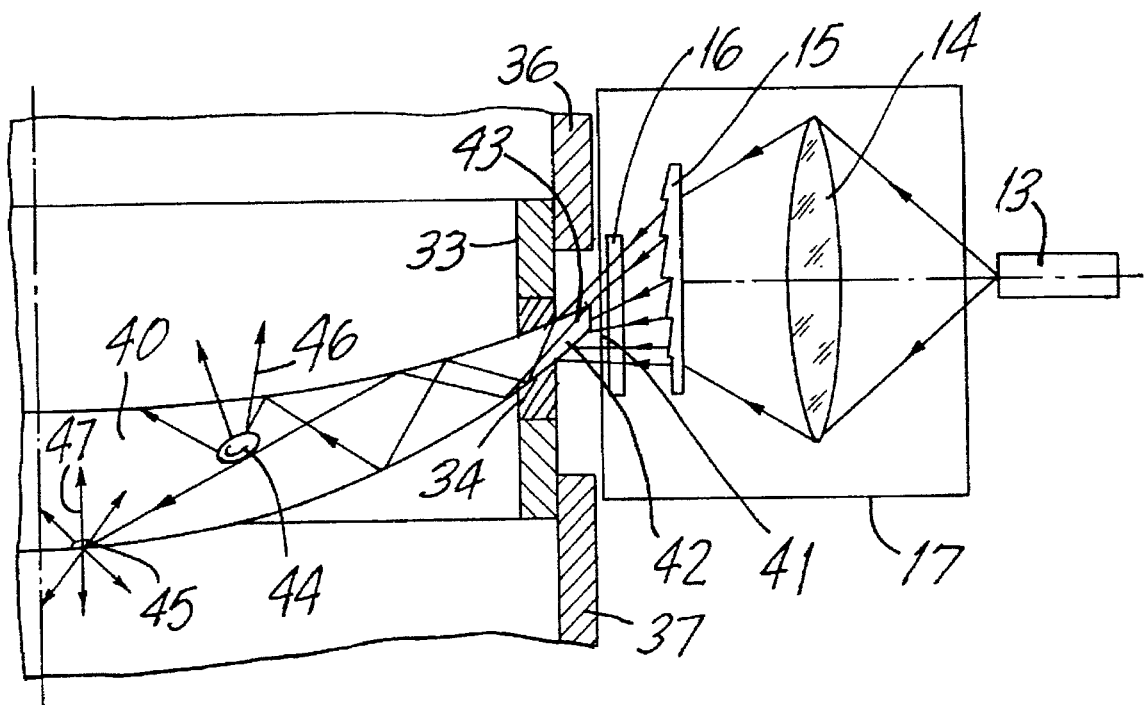

FIGS. 4, 5 schematically illustrate how the inspection radiation is introduced into the component and show paths of the radiation rays within the component.

In the embodiment of FIG. 4 the component 30 to be inspected is a negative meniscus lens having an edge 31 and an illumination beam is introduced into the component through its entire edge 31. As it is explained with reference to FIGS. 2 and 3, the radiation beam conveyed by the optical fiber bundle 13 passes through the lens 14, Fresnel prism 15 and the scatterer 16. The inspected lens 30 is held by clamping ring 32, 33 having jaws 34, 35, mounted in the support schematically indicated at 36, 37, which clamping ring permits to adjust the lens position, relative to the illuminating means, by axial displacement of the lens 30.

FIG. 5 illustrates a positive meniscus lens 40 with an edge 41 and an illumination beam penetrates the lens 40 not only through its edge 41, but also through peripheral surfaces 42 and 43. Elements 14, 15 and 16 may be essentially identical to the same elements of FIG. 3 and elements 13, 32, 33, 34, 35, 36, 37 are the same as in FIG. 4.

Paths of the radiation beams within the component illustrated in FIGS. 4 and 5 are similar, therefore only that of FIG. 5 will be further explained. Thus, the lens 40 receives the radiation from the element 17 through the lens edge 41 and its peripheral surfaces 42, 43. The path of the radiation is indicated by lines and arrows. It undergoes multiple total reflections, but when it encounters an occlusion 44 or a surface imperfection 45, it is scattered out of the lens through the optical surfaces 46, 47.

Figure 6:
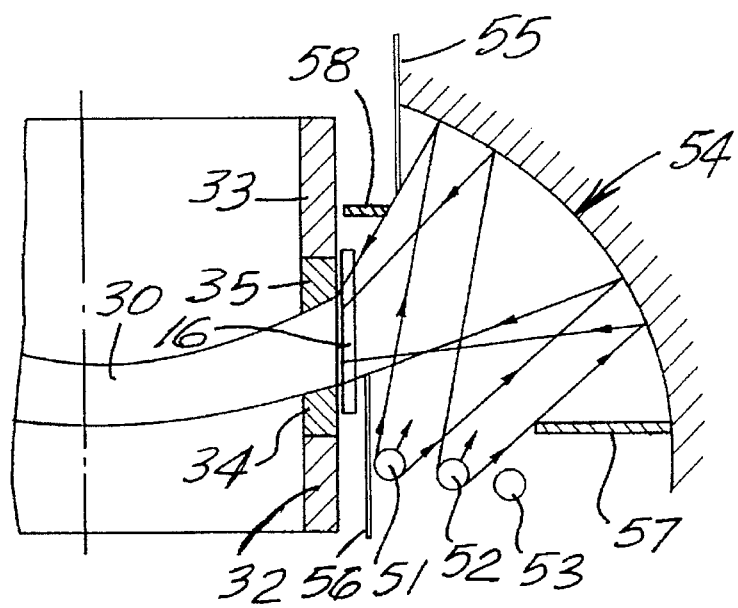
FIGS. 6, 7, 8 and 9 are schematic illustration of the alternative embodiments of the present invention.

FIG. 6 schematically illustrates an alternative embodiment of the invention in which for illumination of the component 30 a number of wide angle radiation sources 51, 52, 53 mounted in concentric rings (only one source of each ring being shown) is used, and for forming the radiation beams and for imparting to them a desired orientation in the meridional plane of the component, a forming and deflection mirror 54 is used in combination with screening rings 55, 56 and/or screening diaphragms 57, 58. In the preferred embodiment the mirror 54 is designed as a torical mirror or a number of torical or cylindrical mirror segments. Suitable insertion angles of the illumination radiation beams are provided by proper disposition of the radiation sources 51, 52, 53 and of the optical component to be tested 30 with regard to the forming mirror 54. To provide desired insertion angles of the inspection radiation suitable for different optical components 30, the mirror 54 and screening rings 55, 56 and/or diaphragms 57, 58 may be preferably adjusted. This may be done by suitable axial displacing mirror 54 or component 30 and/or by radial displacing the mirror segments, axial displacing the screening rings 55, 56 and/or diaphragms 57, 58, and/or by radial and/or axial displacing the radiation sources 51, 52, 53, and/or switching said sources in any combination, the combination of which is chosen with respect to the specifically used illumination of the component. The scatterer 16 forming an extremely wide angle inspection radiation beam in the sagittal plane of the component may be used if the radiation sources divergence angle is not sufficiently wide.

Figure 7:
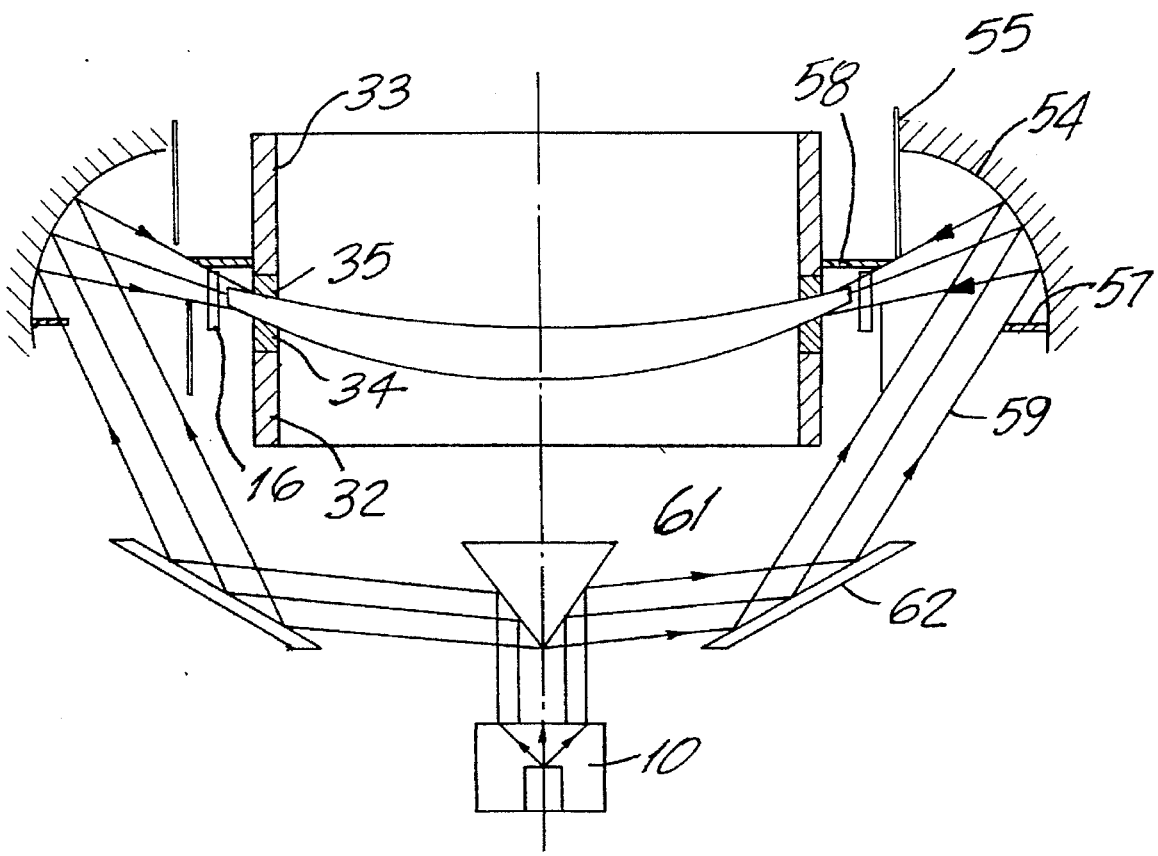

FIG. 7 schematically illustrates an alternative embodiment of the illumination means for testing a component 40, wherein instead of concentric rings of the radiation sources one illumination beam 59 of a ring shaped cross-section is used. In addition, for a more uniform illumination of the component to be tested 40, the forming mirror 54 accomplished by screening rings 55, 56 and/or diaphragms 57, 58 and scatterer 16 is used. The beam is formed by means of suitable conveying means, e.g. designed as a pair of two conical or pyramidal mirrors 61, 62, as illustrated on FIG. 7, or by a properly designed optical fiber bundle. An appropriate adjustment may be provided by inclination and/or radial and axial displacement of mirror segments 54, axial displacing the screening rings 55, 56 and/or diaphragms 57, 58 and/or mirrors 61, 62.

The above preferred embodiments illustrated in FIGS. 6 and 7 may be used for the illumination not only of negative (FIG. 6) or positive (FIG. 7) meniscus but also of all types of lenses and substrates: semi-finished lenses, "plano" lenses, positive and negative lenses of different optical power and of all kinds of ophthalmic lenses: single vision (spherical and torical), bi-focal, progressive, aspherical, etc.

Figure 8:
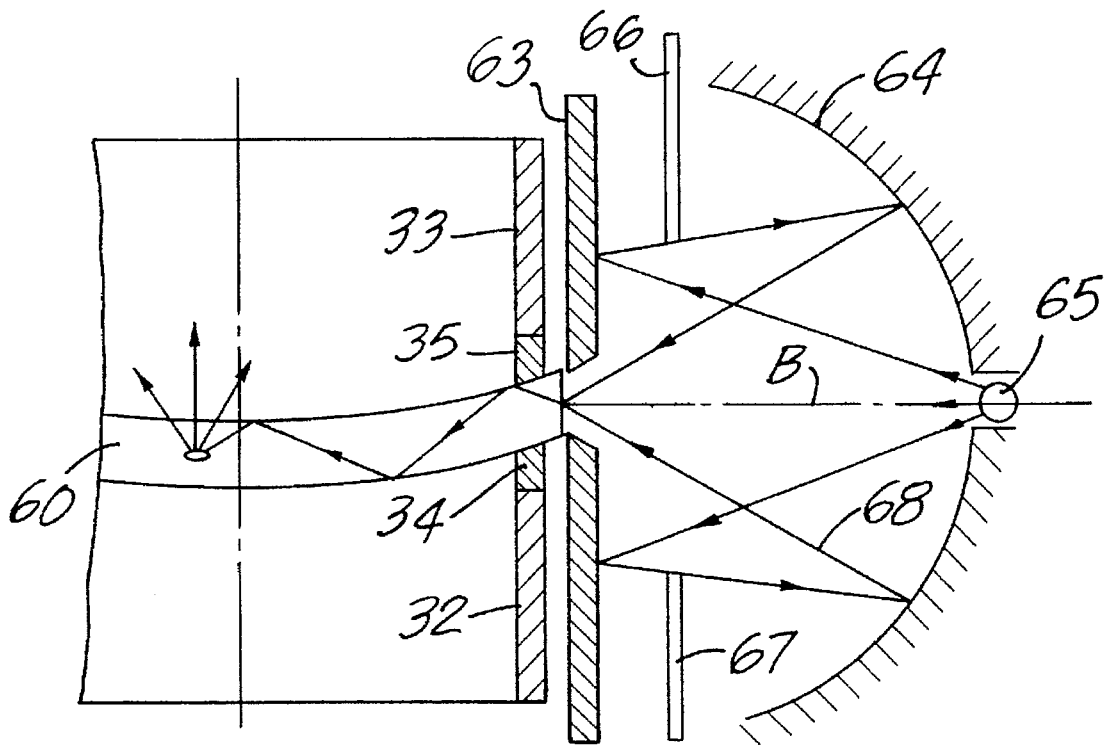

FIG. 8 illustrates an alternative embodiment of the invention, suitable in particular for optical plates and "plano" lenses, in which for producing the widest angles insertion of the illumination radiation received in a meridional plane of a component 60, a combination of cylindrical or conical mirrors 63 with torical mirror 64 is used. An array of wide angle radiation sources is placed on the central plane B of the torical mirror 64 at the position nearest to its surface and is combined with a cylindrical or conical mirror 63 and torical mirror 64 consequently reflecting a radiation beam 68 for insertion thereof into the component 60. The use of screening rings 66, 67, similar to 55, 56 in the previous embodiments, allows to control of an insertion angle of illumination radiation in meridional plane by axial displacement of the rings and enables inspection of optical component of different kinds. Due to the use of the cylindrical (conical) mirror 63 no additional means am needed in the embodiment for spreading the illuminating radiation in the sagittal plane.

Figure 9:
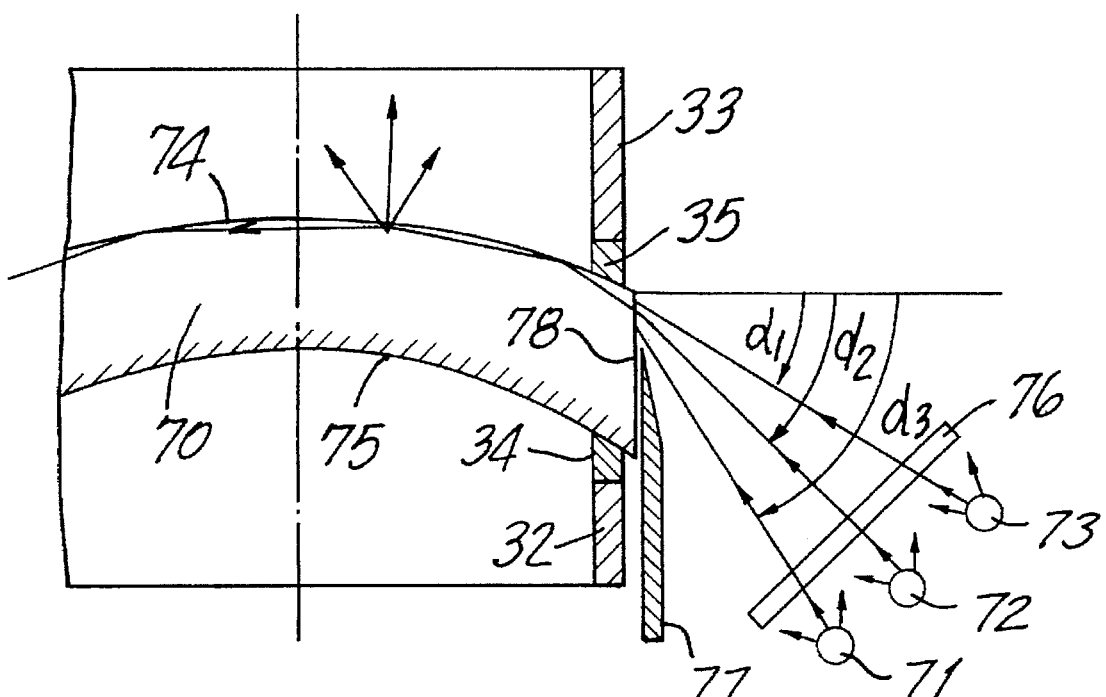

FIG. 9 illustrates the embodiment of a simplest illumination arrangement for inspection of semi-finished lens 70. A number of rings of narrow angle radiation sources 71, 72, 73 (only one source of each ring is shown) is directed to a finished surface 74 of the lens through its edge 78 so as to provide multiple total internal reflections of the radiation from the surface 74 without illuminating a non-finished surface 75. The radiation sources are combined with lenticular scatterers 76 essentially identical to the element 16 in FIGS. 6–8. The width of the radiation insertion zone is limited by a screening ring 77 and may be adjusted by an axial displacement of the ring. An appropriate adjustment of the incidence angle of illumination radiation is provide by switching the suitable radiation sources 71, 72, 73.

In all the embodiments of the present invention the apparatus preferably includes also adjustable clamping rings with jaws made of soft, light-absorbing material, such as rubber, velvet, cloth, felt, etc., for stationary mounting of the component to be inspected and to avoid exterior propagation of the inspection radiation along the optical surfaces of the component. The rings are so designed that they may be adjusted to different diameters of the optical component and they may adjust the position of the optical component relative to the illuminating apparatus along the axis of the component.

Thus, the present invention provides for the method and apparatus enabling such advantages as a possibility to check all kinds of lenses and substrates, particularly ophthalmic lenses, e.g. single vision (spherical, torical), bi-focal, progressive, aspherical, etc. and semi-finished lenses, and differentiating between cosmetic defects of an optical component, such as flaws and occlusions, on the one hand, and dust and water marks on its surfaces, on the other hand, Independence of inspection from said dust and water marks, thereby allowing for inspection of optical components without requiring their prior cleaning.

While the present invention has been described by way of illustration of its preferred embodiments, it will be understood that the invention is not limited to them and may be carried into practice by persons skilled in the art with many variations, modifications and adaptations, without departing from its spirit or exceeding the scope of the claims.

The invention claimed is:

1. Method for testing an optical component for cosmetic defects, said component having optical surfaces, a peripheral surface and a bulk defined by said optical and peripheral surfaces, a range of inspection of said component including at least one said optical surface and said bulk of the component at least in the vicinity of said one optical surface, said method including producing at least one beam of inspection radiation and directing rays of said at least one beam onto said peripheral surface at such angles as to enable the rays to travel in said bulk of the component by multiple total internal reflections from said at least one optical surface, providing illumination of each point in said inspection range by set of rays at different angles, and to emerge from said component through said peripheral surface, and monitoring a radiation scattered by said defects and emerging from the component through said at least one optical surface, thereby identifying said defects.

2. Method according to claim 1, wherein said set of rays is provided in sagittal and meridional planes of the component.

3. Method according to claim 1, wherein the range of inspection of said component includes two optical surfaces and said bulk of the component.

4. Method according to claim 1, wherein the inspection radiation is introduced via component edges.

5. Method according to claim 1, wherein the inspection radiation is introduced, at least in part, through a peripheral part of the optical surface adjacent to said component edges.

6. Method according to claim 1, wherein the inspection radiation consists of a number of beams.

7. Method according to claim 6, wherein said beams of inspection radiation are introduced into the component at a number of zones along said peripheral surface.

8. Method according to claim 1, wherein said at least one beam of inspection radiation cover an aggregate are of at least 150 degrees along said peripheral surface.

9. Method according to claim 1, wherein the inspection radiation consists of one radiation beam having a ring-shaped cross-section in a plane substantially parallel to a sagittal plane.

10. Method according to claim 1, wherein said at least one beam of inspection radiation is formed and oriented with respect to said component substantially in a meridional plane of said component, and scattered substantially in a sagittal plane of said component so as to illuminate at least a part of said peripheral surface of said component.

11. Method according to claim 10, wherein the orientation of the inspection radiation beams with respect to the component is carried out by suitably orienting the component.

12. Method according to claim 1, wherein the radiation scattered by the defects and emerging from said component through said at least one optical surface is monitored by producing therefrom an image which is analyzed by an appropriate image processing method.

13. Apparatus for testing optical components comprising:
means for supporting the component to be tested;
illumination means for producing at least one inspection radiation beam;
means for conveying said at least one beam to a peripheral surface of the component including optical means for forming said at least one beam in a meridional plane of the component and for orienting said at least one beam in said meridional plane of the component so as to enable rays of said at least one beam to travel in a bulk of the component by multiple total internal reflections from at least one optical surface and to emerge from said component through its peripheral surface, and means for scattering said at least one beam in a sagittal plane of the component about its peripheral surface so as to provide said radiation with a substantial divergence in said sagittal plane;
means for receiving radiation, if any, emerging from the optical surface;
means for analyzing said radiation, thereby identifying said defects;
light protection means to avoid a non-controlled illuminating of the component.

14. Apparatus according to claim 13, wherein the means for supporting the component to be tested comprises clamps allowing adjustment of the position of the component parallel to its axis.

15. Apparatus according to claim 13, comprising a radiation source for providing a radiation beam having a ring-shaped cross-section in a plane substantially parallel to said sagittal plane.

16. Apparatus according to claim 15, further including reflecting means for forming and orienting said beam and directing the beam through said scattering means to the peripheral surface of the component.

17. Apparatus according to claim 15, wherein said radiation source is a laser.

18. Apparatus according to claim 13, wherein said illumination means is adapted to produce a number of said inspection radiation beams.

19. Apparatus according to claim 13, wherein the illumination means comprises a plurality of radiation sources.

20. Apparatus according to claim 19, wherein each said plurality of radiation sources is represented by dividing into a number of beams the radiation produced by one radiation source.

21. Apparatus according to claim 20, wherein said illumination means include a number of optical fiber bundles adapted to convey said radiation beams to a plurality of zones about the periphery of the component.

22. Apparatus according to claim 19, wherein the radiation sources are arranged in a number of rings substantially parallel to said sagittal plane of the component.

23. Apparatus according to claim 13, wherein said conveying means include reflection and screening means.

24. Apparatus according to claim 13, wherein said conveying means includes at least one lens and refraction optics.

25. Apparatus according to claim 13, wherein the means for receiving radiation comprises a TV camera.

26. Apparatus according to claim 13, wherein the means for analyzing said radiation to identify said defects of the component comprise image processing means.

* * * * *